(12) United States Patent
Frampton

(10) Patent No.: US 9,843,281 B2
(45) Date of Patent: Dec. 12, 2017

(54) FIELD CURRENT PROFILE

(71) Applicant: Kohler Co., Kohler, WI (US)

(72) Inventor: Isaac S. Frampton, Strattanville, PA (US)

(73) Assignee: Kohler, Co., Kohler, WI (US)

( * ) Notice: Subject to any disclaimer, the term of this patent is extended or adjusted under 35 U.S.C. 154(b) by 0 days.

(21) Appl. No.: 15/014,696

(22) Filed: Feb. 3, 2016

(65) Prior Publication Data

US 2016/0164445 A1    Jun. 9, 2016

Related U.S. Application Data

(63) Continuation of application No. 14/172,046, filed on Feb. 4, 2014, now Pat. No. 9,276,511.

(51) Int. Cl.
| | |
|---|---|
| H02P 11/00 | (2006.01) |
| H02H 7/06 | (2006.01) |
| H02P 9/00 | (2006.01) |
| H02P 9/30 | (2006.01) |
| H02P 9/14 | (2006.01) |

(52) U.S. Cl.
CPC ............ *H02P 9/305* (2013.01); *H02P 9/14* (2013.01)

(58) Field of Classification Search
USPC .................................................. 322/27, 28
See application file for complete search history.

(56) References Cited

U.S. PATENT DOCUMENTS

| | | | |
|---|---|---|---|
| 2,363,857 A | 11/1944 | Crever | |
| 2,668,921 A | 2/1954 | Lash | |
| 3,582,764 A | 6/1971 | Huber | |
| 3,614,586 A | 10/1971 | King | |
| 3,624,504 A * | 11/1971 | Joly | ............ G01R 31/343 |
| | | | 310/68 R |
| 3,753,077 A | 8/1973 | Anderson et al. | |
| 3,763,418 A | 10/1973 | Beck et al. | |
| 3,879,620 A | 4/1975 | Akamatsu | |
| 4,240,015 A | 12/1980 | White | |
| 4,520,272 A | 5/1985 | Danno et al. | |
| 4,535,252 A | 8/1985 | Jacobs et al. | |
| 4,725,751 A | 2/1988 | Bassler et al. | |

(Continued)

FOREIGN PATENT DOCUMENTS

| | | |
|---|---|---|
| CN | 1141527 A | 1/1997 |
| CN | 1144413 A | 3/1997 |

(Continued)

OTHER PUBLICATIONS

European Search Report and Written Opinion cited in EP15153733, mailed Jan. 7, 2016.

(Continued)

*Primary Examiner* — Pedro J Cuevas

(74) *Attorney, Agent, or Firm* — Lempia Summerfield Katz LLC

(57) ABSTRACT

An output of a generator may vary according to the speed of the engine, physical characteristics of the engine, or other factors. A profile for a generator that describes a periodic fluctuation in an operating characteristic for the generator is identified. A field current of an alternator associated with the generator is modified based on the profile for the generator in order to counter variations in the output of the generator.

20 Claims, 12 Drawing Sheets

(56) References Cited

U.S. PATENT DOCUMENTS

| | | | |
|---|---|---|---|
| 5,111,784 A | 5/1992 | Kuriyama et al. | |
| 5,119,010 A | 6/1992 | Shirata et al. | |
| 5,256,959 A | 10/1993 | Nagano et al. | |
| 5,521,809 A | 5/1996 | Ashley et al. | |
| 5,646,599 A | 7/1997 | Adachi | |
| 5,726,558 A | 3/1998 | Umeda et al. | |
| 5,730,094 A | 3/1998 | Morris | |
| 5,739,677 A | 4/1998 | Tsutsui et al. | |
| 6,426,609 B2 | 7/2002 | Tanaka et al. | |
| 6,456,048 B2 | 9/2002 | Taniguchi et al. | |
| 6,548,990 B2 | 4/2003 | Okuno et al. | |
| 6,555,994 B1* | 4/2003 | Keane | G05B 19/042 322/25 |
| 6,704,214 B1 | 3/2004 | Gibbs et al. | |
| 6,914,399 B2* | 7/2005 | Kushion | H02P 6/10 318/434 |
| 7,034,412 B2 | 4/2006 | Kuribayashi | |
| 7,098,628 B2 | 8/2006 | Maehara et al. | |
| 7,106,029 B2 | 9/2006 | Inokuchi et al. | |
| 7,116,562 B2 | 10/2006 | Takashima et al. | |
| 7,262,977 B2 | 8/2007 | Kyono | |
| 7,301,247 B2* | 11/2007 | Kishibata | H02J 1/102 307/29 |
| 7,383,902 B2 | 6/2008 | Matsuzaki et al. | |
| 7,417,408 B2 | 8/2008 | Poyhonen et al. | |
| 7,459,801 B2 | 12/2008 | Shimoyama et al. | |
| 7,487,026 B2 | 2/2009 | Kawashima et al. | |
| 8,205,594 B2 | 6/2012 | Fore et al. | |
| 8,405,365 B2* | 3/2013 | Nakada | H02P 9/305 318/254.1 |
| 8,525,468 B2* | 9/2013 | Winterhalter | H02P 27/06 318/798 |
| 8,569,902 B2 | 10/2013 | Gibson et al. | |
| 8,569,903 B2 | 10/2013 | Gibson et al. | |
| 8,664,783 B2 | 3/2014 | Gibson et al. | |
| 8,710,685 B2 | 4/2014 | Gibson et al. | |
| 9,175,631 B2 | 11/2015 | Pan | |
| 9,276,511 B2* | 3/2016 | Frampton | H02P 9/14 |
| 9,590,545 B2* | 3/2017 | Frampton | H02P 9/00 |
| 2001/0043055 A1 | 11/2001 | Tanaka et al. | |
| 2002/0000791 A1 | 1/2002 | Taniguchi et al. | |
| 2003/0222513 A1 | 12/2003 | Kuribayashi | |
| 2004/0036294 A1* | 2/2004 | Kishibata | H02J 1/102 290/14 |
| 2004/0163860 A1 | 8/2004 | Matsuzaki et al. | |
| 2005/0085980 A1 | 4/2005 | Kawashima et al. | |
| 2005/0206350 A1 | 9/2005 | Inokuchi et al. | |
| 2006/0012322 A1 | 1/2006 | Matsumoto et al. | |
| 2007/0052243 A1 | 3/2007 | Shimoyama et al. | |
| 2008/0197904 A1 | 8/2008 | Bolz | |
| 2010/0106389 A1 | 4/2010 | Fore et al. | |
| 2011/0241580 A1* | 10/2011 | Winterhalter | H02P 27/06 318/400.3 |
| 2012/0104767 A1 | 5/2012 | Gibson et al. | |
| 2012/0104768 A1 | 5/2012 | Gibson et al. | |
| 2013/0038303 A1 | 2/2013 | Krause | |
| 2014/0035291 A1 | 2/2014 | Gibson et al. | |
| 2014/0055102 A1 | 2/2014 | Gibson et al. | |
| 2014/0253054 A1* | 9/2014 | Frampton | H02P 9/14 322/28 |
| 2015/0115904 A1 | 4/2015 | Sasaki et al. | |
| 2015/0222213 A1* | 8/2015 | Frampton | H02P 9/305 322/59 |
| 2016/0149527 A1* | 5/2016 | Frampton | H02P 9/00 322/17 |
| 2016/0149528 A1* | 5/2016 | Frampton | H02P 9/00 322/20 |
| 2016/0164445 A1* | 6/2016 | Frampton | H02P 9/305 322/27 |
| 2016/0301345 A1* | 10/2016 | Frampton | H02P 9/00 |
| 2017/0110976 A1* | 4/2017 | Frampton | H02M 5/458 |
| 2017/0110991 A1* | 4/2017 | Frampton | H02P 5/74 |
| 2017/0110996 A1* | 4/2017 | Frampton | H02P 9/08 |

FOREIGN PATENT DOCUMENTS

| | | |
|---|---|---|
| CN | 101018036 A | 8/2007 |
| DE | 369642 | 2/1932 |
| EP | 0035608 | 9/1981 |
| EP | 0440185 A2 | 8/1991 |
| GB | 190314067 | 0/1904 |
| GB | 479056 | 1/1938 |
| GB | 560180 | 3/1994 |
| JP | 2010035331 | 2/2010 |

OTHER PUBLICATIONS

Peng et al., An Auxiliary Quasi-Resonant Tank Soft-Switching Inverter, 2000, IEEE.

Chinese Office Action for Chinese Patent Application No. 201510054866.5 dated Jan. 3, 2017, with English Abstract..

* cited by examiner ature of the system.

FIELD CURRENT PROFILE

This application is a continuation under 35 U.S.C §120 and 37 C.F.R. §1.53(b) of U.S. patent application Ser. No. 14/172,046 filed Feb. 4, 2014, the disclosure of which is incorporated herein by reference in its entirety.

TECHNICAL FIELD

This disclosure relates in general to a field current profile, or more particularly, to a field current profile to control output of a generator.

BACKGROUND

A private residence normally receives power from a utility company. The reliability of the power company depends on many factors such as the weather, usage spikes, short circuits, accidents or other damage to transmission lines or power stations. Certain locations may be particularly prone to blackouts. Low lying areas may be susceptible to floods. Coastal areas may be susceptible to hurricanes. High usage geographic areas may be susceptible to rolling blackouts.

Any breaks in power utility service may be unacceptable to customers, and some businesses may have mission critical systems, such as computer systems in call centers or refrigerators in grocery stores, that rely on constant power. In other businesses such as hospitals, lives may be lost if the power to a respirator is interrupted. These customers may rely on a backup source of powers.

One backup source of power is a generator. A generator may produce electricity at various voltage levels and frequencies. The shape of the output is comparable to a sinusoid. However, the output may not be a perfect sinusoid. Certain applications or end users may require a more ideal output from the generator.

BRIEF DESCRIPTION OF THE DRAWINGS

Exemplary implementations are described herein with reference to the following drawings.

DETAILED DESCRIPTION

Figure 1:
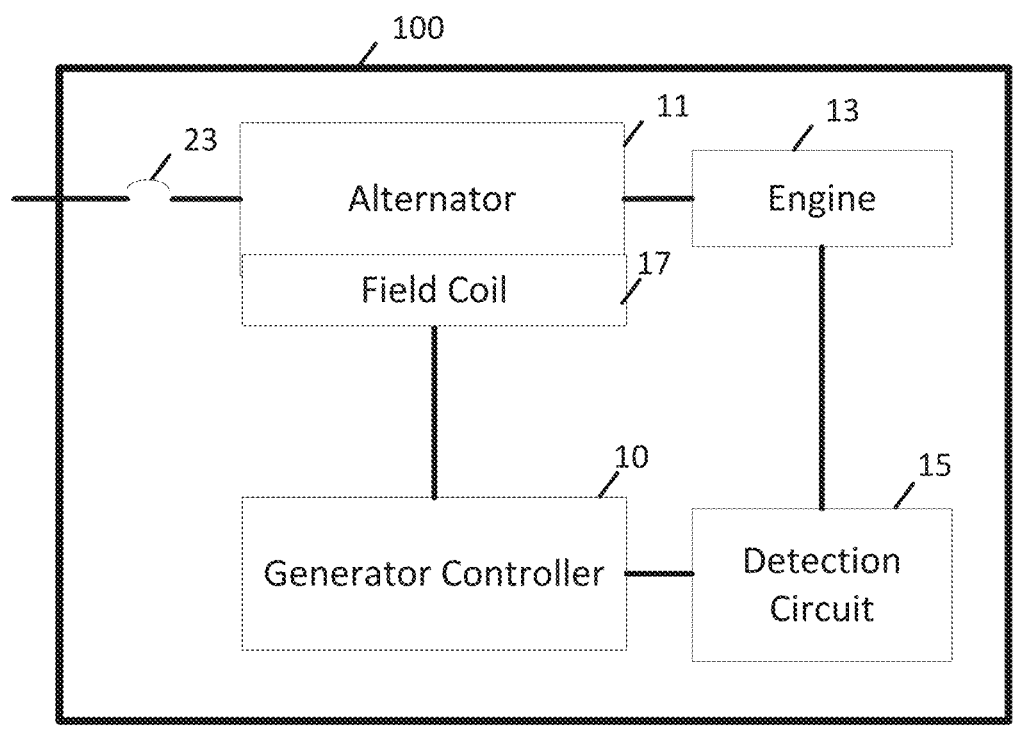
FIG. 1 illustrates an example generator including a field current control system.

An engine-generator set, which may be referred to as a generator or a genset, may include an engine and an alternator or another device for generating electrical energy. Example types of generators include towable generators, portable generators, marine generators, industrial generators, residential generators or other standby generators. A generator may include a rotor and a stator. The stator may include output windings, and the rotor may include field windings. Other arrangements are possible.

A generator may generate an output voltage (also referred to as an "output") having a magnitude. The magnitude of the output voltage as measured over a period of time may form a shape or waveform (referred to an "output shape" or as a "shape of the output") and amplitude. Various factors affect the magnitude of the output voltage and therefore contribute to the shape and/or amplitude of the output of a generator. The shape or amplitude of the output may be a function of the physical dimensions of the rotor and/or the speed of the engine.

The physical dimensions of the rotor may affect the shape of the output. The magnetic field generated by the rotor by movement relative to the stator may induce a voltage between windings of the stator. When the shape of the rotor is irregular, the voltage of the output is irregular. For many applications, an irregularly shaped output voltage has no effect on the performance of the system. However, some applications may have tight tolerances for the magnitude of the output voltage. In some instances, the output voltage may be irregular enough to cause flicker in lights powered by the generator. More commonly, many users may perceive that a regularly shaped output voltage leads to better performance of the system irrespective of the actual performance of the system.

In addition, speed fluctuations of the engine may affect the shape or amplitude of the output. When an engine is undergoing a power stroke, the engine is applying positive torque to the crankshaft. When the torque to the crankshaft is more than the torque demanded by the alternator, the crankshaft and the alternator rotor accelerate. When the torque produced by the engine is less than the alternator demands, the crankshaft and the alternator decelerate. The additional energy is stored in the rotating crankshaft. Energy from the crankshaft compresses the gas in the cylinder, and supplies energy back to the crankshaft when the gas explodes. Through these cycles of acceleration and deceleration, the crankshaft is speeding up and slowing down, which may create fluctuations in the shape or amplitude of the output.

Additionally or alternatively, the shape or amplitude of the output may be directly proportional to the field current. The following examples introduce field current control to counter or reduce the fluctuations in output caused by speed fluctuations of the engine or the mechanical construction of the alternator. The field current of the alternator may be controlled as a function of the fluctuations in output or predicted fluctuations in output.

FIG. 1 illustrates an example generator 100 including a field current control system. The generator 100 may include a controller 10, an alternator 11, an engine 13, a detection circuit 15, and a field coil 17. Optionally, an internal switch (e.g., circuit breaker 23) may control an electrical connection turn the output of the generator 100 on and off. In other examples, the controller 10 may be external to the generator 100, and may communicate with and/or control the generator 100 through a wired or wireless network or connection. Additional, different, or fewer components may be included.

The controller 10 may identify a profile for the generator 100. The profile may describe a periodic fluctuation in one or a combination of operating characteristics for the generator 100. The profile may be accessed from a database or another memory in communication with the controller 10. The operating characteristics may include the speed of the engine 13 (e.g., speed of the crankshaft), the speed of the alternator 11, or the output (e.g., voltage, current, or power) of the generator 100.

The values for the profile may be measured by the detection circuit 15. The detection circuit 15 may be a voltage sensing circuit or a current sensing circuit to monitor sensor output. The detection circuit 15 may include a sensor for determining the speed of the generator 100.

The sensor may directly detect the movement of a component such as a crankshaft, gear box, transmission, armature, rotor, or another component. The direct type of sensor may be or include a torque sensor, a deflection sensor, a dynamometer, a positional sensor, or a revolution sensor.

For example, a deflection sensor may measure a deflection of the crankshaft or another device. The deflection sensor may include two position sensors. The position sensors may be associated with different sides of the crankshaft. As an example, the sensor may be a positional sensor (e.g., position sensor or accelerometer) that may measure the change in rotation of a crankshaft or other component of generator 100. The revolution sensor may be a magnetic sensor that detects a change in a magnetic field, an optical sensor that detects indicia on the component, a contact sensor that detects a tab or protrusion on the crankshaft, or another component.

Additionally or alternatively, the sensor may indirectly detect the movement of the component. For example, the movement of the component may be inferred from the operation of a fuel injected as detected by a fuel injector sensor or inferred from fuel consumption as detected by an air to fuel ratio (AFR) sensor. As an example, a fuel injector sensor may measure a quantity of fuel supplied to the engine 13 of the generator 100. The quantity of the fuel may be determined based on a pulse width value of the fuel injector. The AFR sensor may measure the ratio of air to fuel in the engine 13 of the generator 100. The air flow through the engine 13 may be calculated based on the ratio of air to fuel and the quantity of fuel.

The controller 10 may generate, control, or modify a field current for the alternator 11 based on the profile that describes the periodic fluctuation in the operating characteristic for the generator 100. The field current may flow through a coil of wire coiled around a magnetic conductive material. The magnetic conductive material may form the stator or rotor of the alternator 11. As the field current is increased or decreased the output of the generator 100 fluctuates proportionally. Accordingly, speed fluctuations of the engine 13, which would normally lead to output fluctuations, may be countered by increasing or decreasing the field current. The controller 10 may generate and apply a positive voltage, or increase the voltage, to the alternator 11 to increase the field current during at least one portion of the profile and/or apply a negative voltage, or decrease the voltage, to the alternator 11 to decrease the field current during at least one portion of the profile.

The generator 100 may also include one or more of a fuel supply, a cooling system, an exhaust system, a lubrication system, and a starter. Additional, different, or fewer components may be included. The alternator 11 may include an electromechanical rotating magnetic field and a stationary armature, a rotating armature with a stationary magnetic field, or a linear alternator. The engine 13 may be powered by gasoline, diesel fuel, or gaseous fuel. Examples of gaseous fuels may be liquefied petroleum gas (LPG), hydrogen gas, natural gas, biogas, or another gas. Examples of LPG may be or include primarily butane, primarily propane, or a mixture of hydrocarbon gases. The hydrogen gas may include hydrogen mixed with air or oxygen. The hydrogen gas may be mixed with another fuel when delivered to the engine 13. Natural gas (e.g., compressed natural gas (CNG)) may be a hydrocarbon gas mixture. Biogas may be a gas produced by the breakdown of organic material. Other variations are possible.

Figure 2:
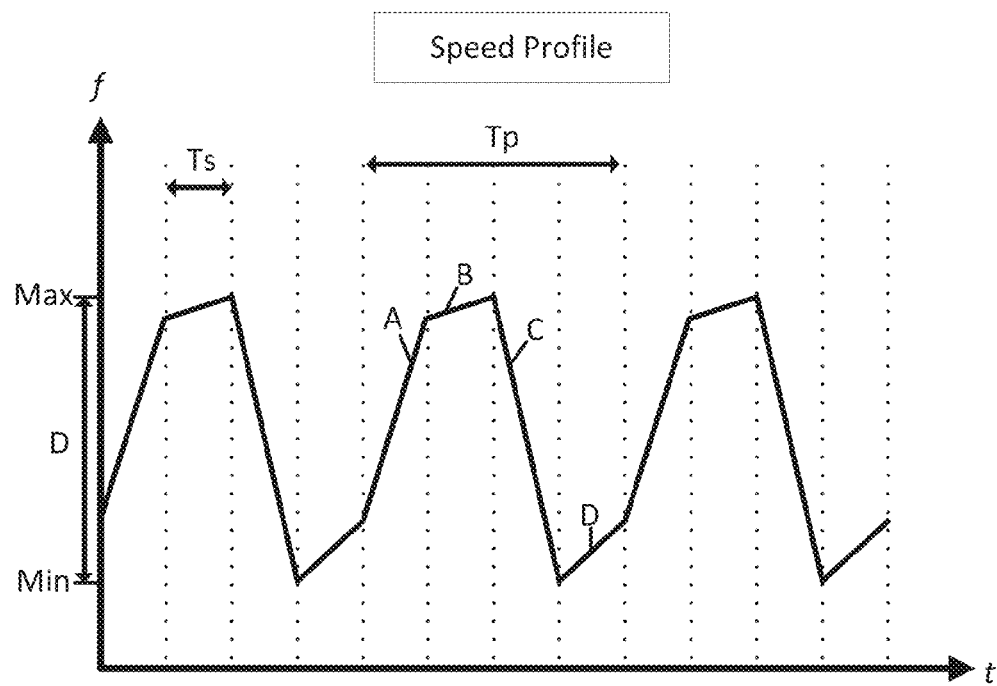
FIG. 2 illustrates an example speed profile for a generator.

FIG. 2 illustrates an example speed profile for a generator. The speed profile may be continuous or discrete. The speed profile may fluctuate between a maximum frequency and a minimum frequency. The frequency may be measured in rotations per unit time. The speed profile may be a function of the combustion cycle of the engine 13 and/or the physical construction of the generator. The speed profile may be periodic. The period of the speed profile (Tp) may depend on the diameter of the rotor or the average speed of the alternator 11. The circumference of the rotor divided by the average frequency (rotations per unit time) provides the amount of time for one rotation, which may be the period of the speed profile (Tp).

The speed profile may be based on a set of samples taken or made by the detection circuit 15. The samples may be made at a predetermined interval (Ts). The interval Ts may be constant or variable. Example values for the interval Ts include 5 milliseconds, 10 milliseconds, 16 milliseconds, 16.7 milliseconds, 17 milliseconds, 20 milliseconds or another value. The interval Ts may be selected based as the inverse of the frequency of the output of the generator (e.g., $\frac{1}{50}$ Hz=20 milliseconds, $\frac{1}{60}$ Hz=16.7 milliseconds). The interval Ts may be selected based on a user input or in various other ways.

The speed profile may be a discrete or piecewise function and have a number of segments corresponding to the number of measurement samples. For example, FIG. 2 includes four repeating segments A, B, C, and D, each having a horizontal length that corresponds to interval Ts. The absolute minimum and maximum values for the speed profile may not coincide in time with the samples. The interval Ts may be varied in order to determine locations the absolute maximum value and/or the absolute minimum value. For example, the interval Ts may be increased in small increments in order to identify an interval Ts that intersects the absolute maximum value and/or the absolute minimum value of the speed profile.

Figure 3:
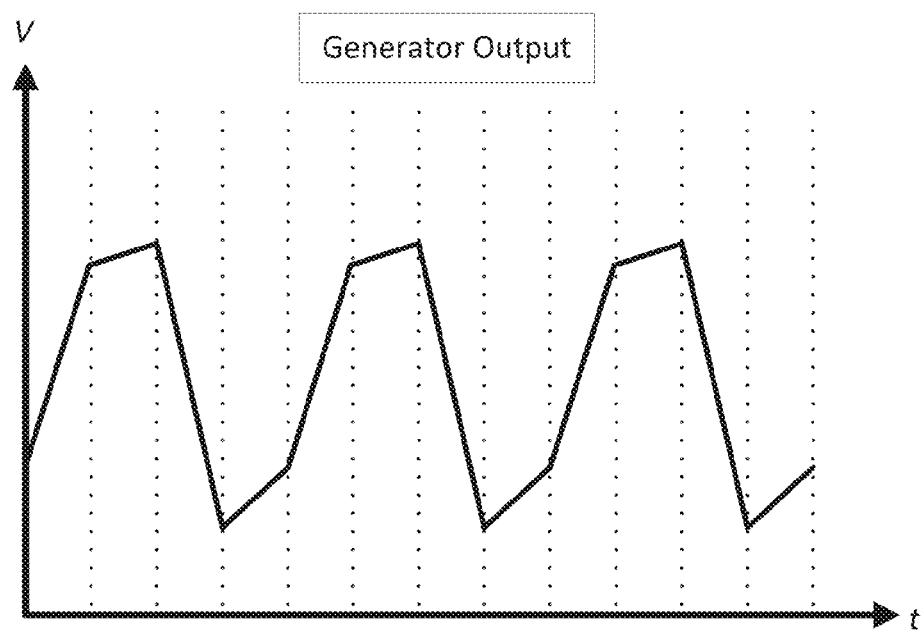
FIG. 3 illustrates an example output for the speed profile of FIG. 2.

FIG. 3 illustrates an example output produced by an alternator of a generator operating under the speed profile of FIG. 2. The output of the alternator may be measured in voltage, current, or power. The output may be proportional to the speed profile or have a shape congruent to the shape of the speed profile.

The output may be considered congruent to the speed profile based on the relative change in ratios between the speed profile and the output. In one example, the two shapes are considered congruent based on the ratios to the minimum values and maximum values of the shapes. For any period, the ratio of the maximum value of the speed profile value to the maximum value of the output is calculated and the ratio of the minimum value of the speed profile value to the minimum value of the output is calculated. When the difference between the ratios is within a predetermined range, the two shapes are considered congruent. Examples for the predetermined range include 0.8 to 1.05 and 0.9 to 1.1. In addition or in the alternative, the two shapes may be considered congruent when one or more maximum values of the speed profile occur within a predetermined time period of one or more maximum values of the output and/or one or more minimum values of the speed profile occur within a predetermined time period of one or more minimum values of the output. Example predetermined time periods include 5 milliseconds and 10 milliseconds.

Figure 4:
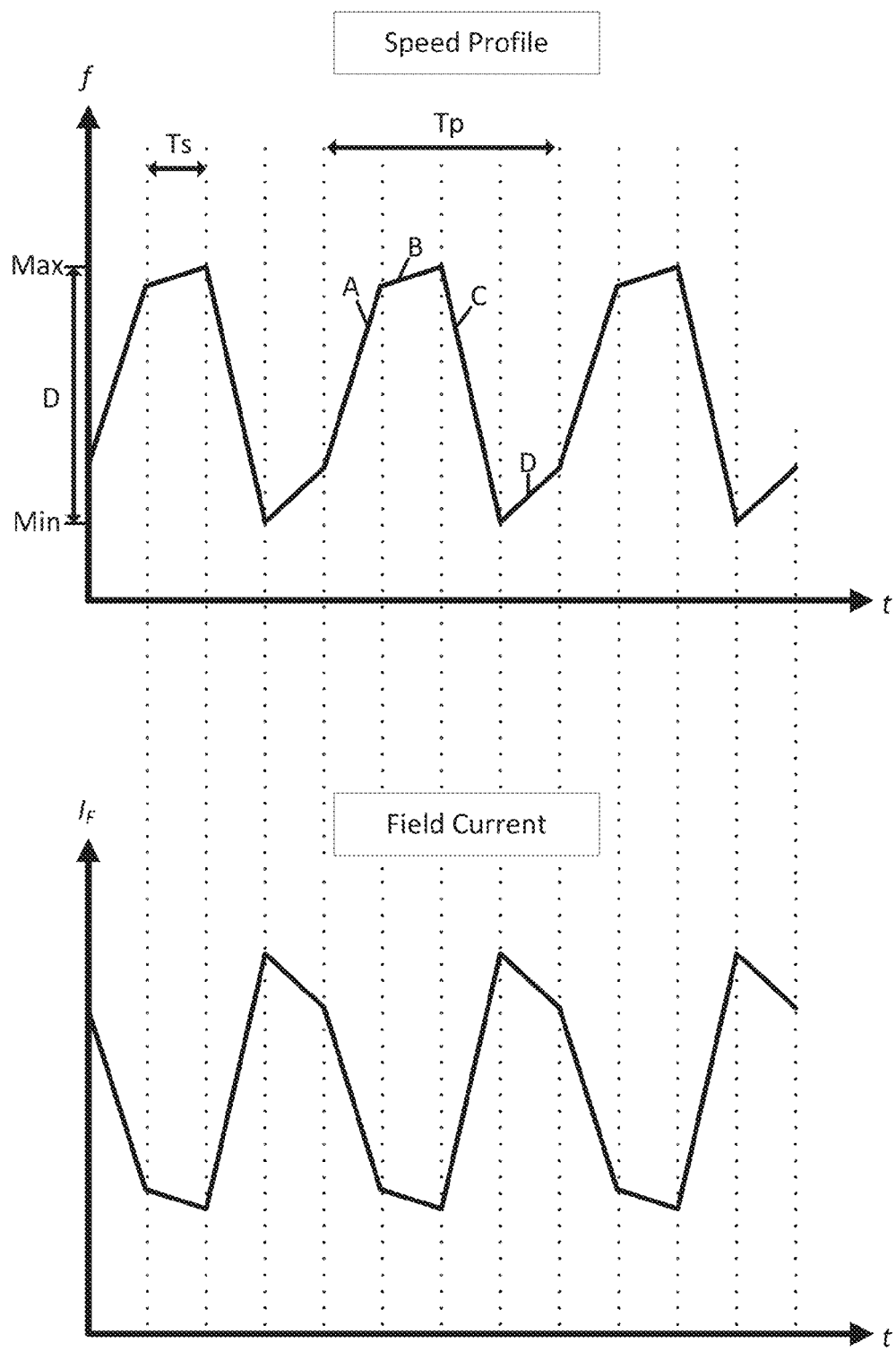
FIG. 4 illustrates an example modified field current.

FIG. 4 illustrates an example modified field current according to the speed profile of FIG. 2. The controller 10 may identify the speed profile of the engine, such as through detecting the engine speed, monitoring an output voltage, current, or power, or by using date or information about an engine type or speed from a look-up table. The controller 10 may control the field current as shown in FIG. 4 to counteract the fluctuations in the engine speed or output voltage, current, or power. The speed profile of FIG. 2 is illustrated to show the changes in the modified field current track changes in the speed profile. The modified field current may be inversely proportional to the speed profile. The inversely proportional relationship may be constant throughout period Tp or may fluctuate with a predetermined range. The predetermined range may be plus or minus any percentage value from 1% to 15%. As the field current and engine speed fluctuations counteract each other, fluctuations in the output voltage may be reduced and the output voltage may be nearly constant.

In another example, the modified field current may be inversely congruent to the speed profile. In one example, the two shapes are considered inversely congruent based on the ratios to the minimum values and maximum values of the shapes. For any period, the ratio of the maximum value of the speed profile value to the corresponding minimum value of the output is calculated and the ratio of the minimum value of the speed profile value to the corresponding maximum value of the output is calculated. When the difference between the ratios is within a predetermined range, the two shapes are considered inversely congruent. Examples for the predetermined range include 0.8 to 1.05 and 0.9 to 1.1. In addition or in the alternative, the two shapes may be considered inversely congruent when one or more maximum values of the speed profile occur within a predetermined time period of one or more minimum values of the output and/or one or more minimum values of the speed profile occur within a predetermined time period of one or more maximum values of the output. Example predetermined time periods include 5 milliseconds and 10 milliseconds.

It should be appreciated that the systems and methods of field current control to establish more constant output voltage may additionally or alternatively be performed to counter or reduce output voltage variations caused by various other issues known or unknown, including fluctuations caused by the shape of the rotor.

Figure 5:
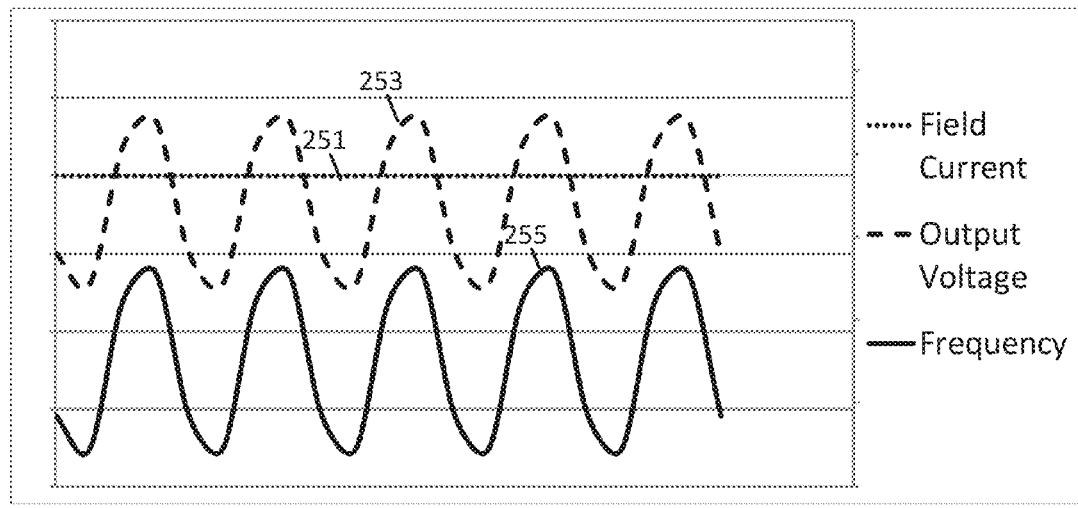
FIG. 5 illustrates an example comparison of field current, output voltage, and frequency for a generator.
Figure 6:
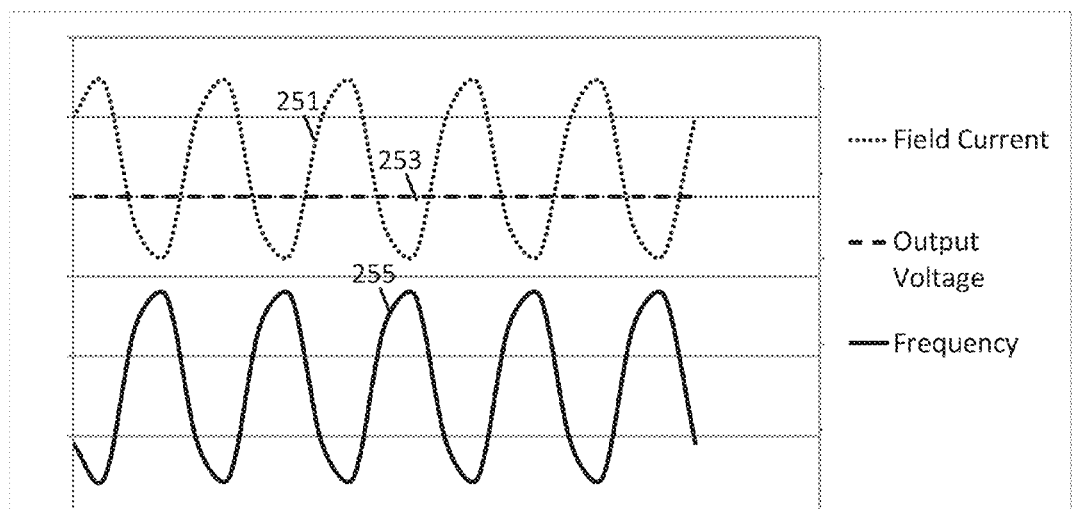
FIG. 6 illustrates the example of FIG. 5 with a modified field current.

FIGS. 5 and 6 illustrate another example using continuous functions. The field current control may be activated and deactivated according to a control signal. The control signal may be generated based on instructions received from a user, a predefined schedule, or a feedback control system. The user may activate or deactivate the field current control through a switch, button, or other setting on the generator 100 or controller 10, which triggers the control signal. The user may remotely send a command to the generator controller 10 through a mobile application or a website. The predefined schedule may activate the field current control during peak hours and deactivate the field current control outside of peak hours. The feedback control system may monitor the output of the generator (e.g., voltage sensor or current sensor) and activate the field current control when the output exceeds a threshold value. The threshold value may be a percentage of the average output (e.g., 5% or 10%), a number of standard deviations from the mean output (e.g., 1 standard deviation), or a set value (e.g., 100 volts, 130 volts).

FIG. 5 illustrates an example comparison of field current, output voltage, and frequency for a generator when the control signal deactivates the field current control. FIG. 6 illustrates the example of FIG. 5 with an example modified field current when the control signal activates the field current control.

In FIG. 5, with the field current control deactivated, the field current is constant, as shown by the dotted line 251. The output voltage may be a root mean squared (RMS) value or a peak voltage value. The output voltage, as shown by the dashed line 253, may fluctuate for various reasons, such as in accordance with variations in the frequency or speed of the engine or alternator, as shown by the solid line 255. The controller 10 may identify or detect the output voltage, such as through a feedback signal or predefined schedule. In FIG. 6, with the field current control activated, the field current is controlled to fluctuate in an inverse relationship to the frequency or speed of the alternator. The field current may be controlled to fluctuate between a maximum current and a minimum current. Examples include 1.19 amps for the minimum current and 1.21 amps for the maximum current over each interval Ts (e.g., 16.7 milliseconds). Accordingly, the output voltage, as shown by dashed line 253, becomes relatively constant (e.g., within a fluctuation tolerance).

Figure 7:
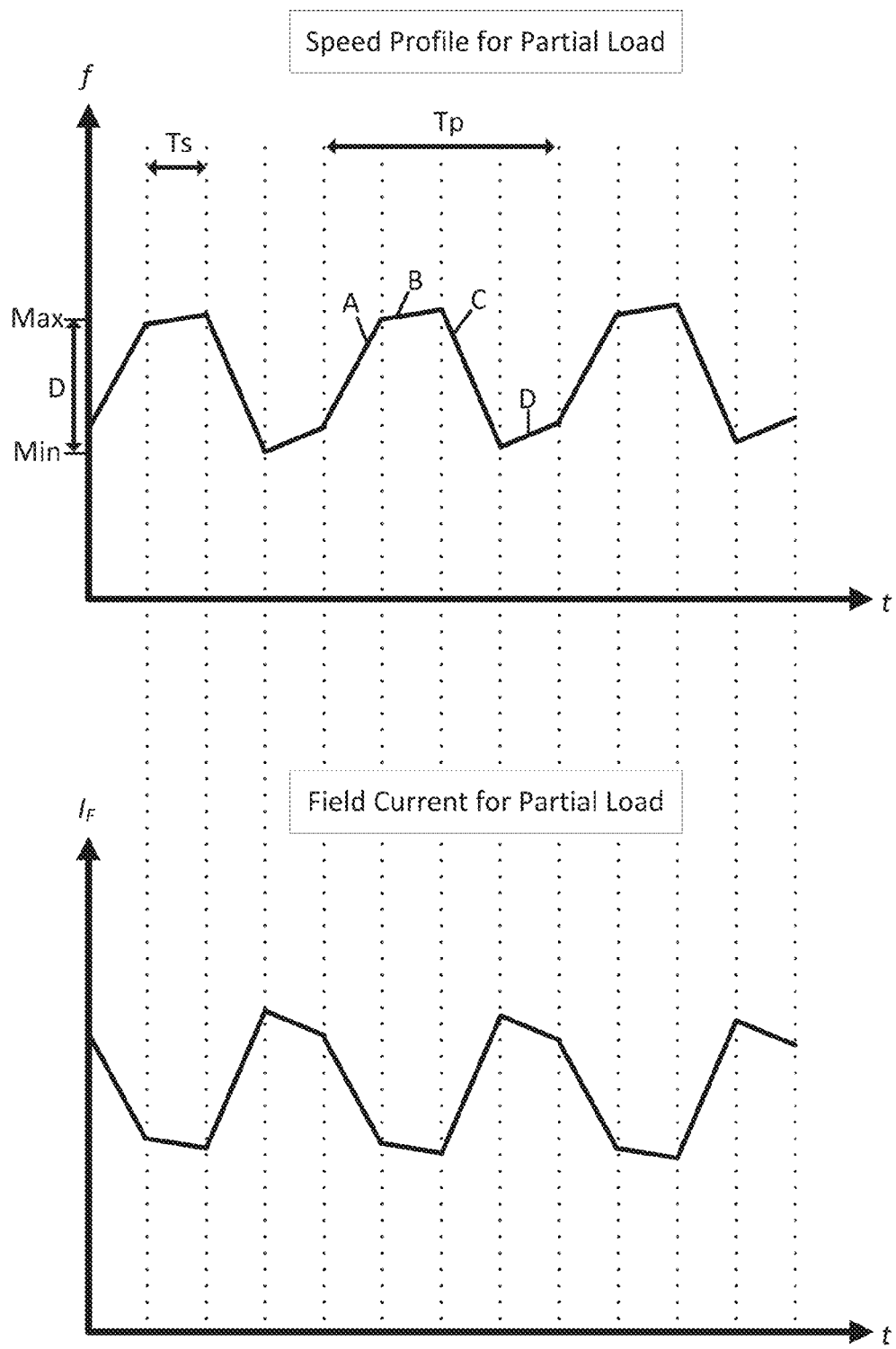
FIG. 7 illustrates another example modified field current.

FIG. 7 illustrates another example modified field current. The modified field current of FIG. 7 corresponds to a speed profile for the engine 13 in partial load. When the engine 13 is in partial load, the interval Ts and the period Tp may not change. However, the maximum value and minimum value may fluctuate (or amplitude D of the speed profile may decrease) as a function of the load. The controller 10 may identify the instance of partial load, such as through a load monitoring system or a feedback control system, and may decrease the range of the field current proportionally.

In one example, the generator controller 10 may store multiple speed profiles that correspond to possible loads on the engine 13. The multiple speed profiles may include a low load speed profile, a medium load speed profile, and a high load speed profile. Each of the multiple speed profiles may be derived through operating the engine 13 at a corresponding load. The variance of the speed profile may vary proportionally to the load on the engine 13. The controller 10 may generate or access a speed profile using a closed loop feedback for detecting the load on the engine 13 or through a lookup table for available speed profile. As the load on the engine 13 increases, more power may be demanded and more gas may be compressed, which slows down the engine 13. When the engine 13 is significantly slowed down, the engine 13 fires harder and speeds up more.

The variation of the speed profile may be a function of the type of engine, the inertia of the engine, and features of the engine (e.g., turbocharger). A low variance may be about 1% between the absolute maximum and absolute minimum in a period. A medium variance may vary about 3%, and a high variance may vary about 6%. Other variances at any value are possible.

The values that make up the speed profile may fluctuate according to combustion cycles of the engine 13. Thus, the shape or variance of the speed profile may be a function of the number of cylinders of the engine 13. An engine with four or more cylinders may have a speed profile with low variance because one cylinder out of the four or more cylinders is usually firing or approaching firing. That is, the crankshaft has less time to decelerate after a power stroke of one cylinder before a power stroke of another cylinder begins. The combustion cycles of any one cylinder is balanced by the combustion cycles of the other cylinders.

On a single cylinder engine, the speed profile has a high variance because there are no other cylinders to balance the combustion cycles of the single cylinder. The compression stroke significantly slows down the engine (e.g., extracts power from the crank shaft) and the power stroke significantly speeds up the engine (e.g., adds power to the crank shaft). The intake stroke and exhaust stroke may slow down the engine to a lesser extent.

In a two cylinder engine, the speed profile may have a medium variance for reasons similar to the four cylinder engine discussed above. However, for a two cylinder odd fire engine, the speed profile may have a high variance (e.g., even higher than in the one cylinder example). In a two cylinder odd fire engine, the cylinders fire close together in time. In one example, during the 360 degrees rotation of the crankshaft, the first cylinder fires at 270 degrees and the second cylinder fires at 450 degrees (90 degrees of the subsequent cycle). The speed of the crankshaft may reach a first maximum after the first cylinder fires and a second, higher maximum after the second cylinder fires.

The speed profile of an engine with an odd number of cylinders may have a variance because the cycles of the engine and the alternator may be out of synch. A three cylinder engine may fire every 240 degrees. The alternator may be a two pole alternator that takes power every 180 degrees or a four pole alternator that takes power every 90 degrees. In either case, there may be aliasing between the alternator and the engine because the engine fires and the alternator draws power at varying times relative to each other.

Figure 8:
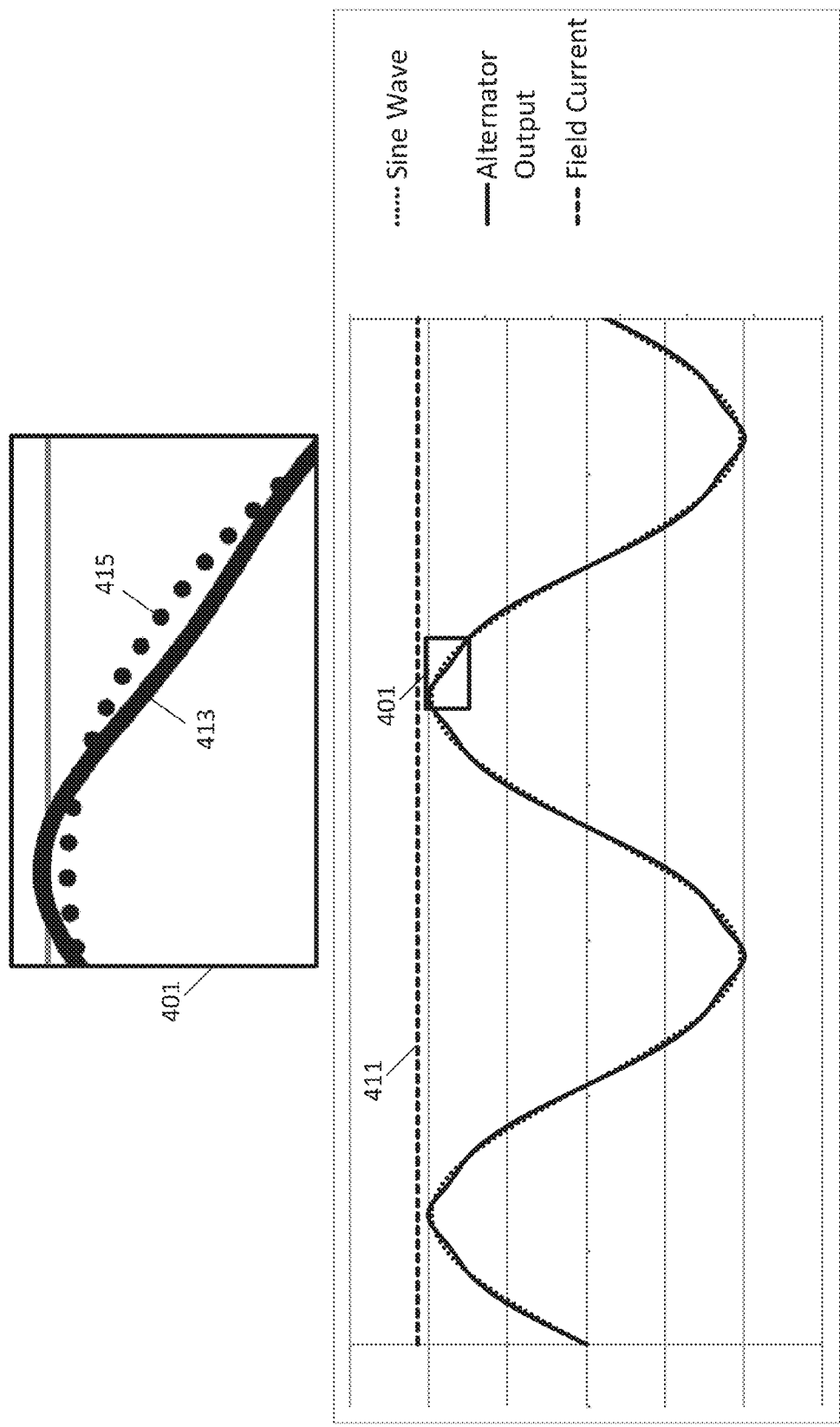
FIG. 8 illustrates an example output for a generator.

FIG. 8 illustrates an example output for a generator with field current control deactivated. Because the field current control is deactivated, the field current, as shown by dash line 411 is substantially constant. Window 401 illustrates the deviation between the alternator output, as shown by solid line 413, and a sine wave, as shown by the dotted line 415.

Harmonics in the alternator output may contribute to the deviation between the alternator output and the sine wave. The harmonics may be caused by the geometric shape of the alternator. While a perfect alternator may be a perfectly round device that provides a perfect sinusoid, such an alternator would be very inefficient and difficult to manufacture. In practice, windings of the alternator have a pitch that is not uniform (unity). The rotor cannot be perfectly round nor can the stator be a full pitch. The resulting waveform is imperfect. The shape of the resulting waveform may be expressed as a sum of sinusoids of varying order.

The periodic wave form can be expressed as a sum of odd ordered sinusoids of varying frequency. In one example, the first order sinusoid has a frequency of 50 or 60 Hz, the third order has a frequency of 150 or 180 Hz, and so on. Detectable harmonics may include the $5^{th}$ order, the $7^{th}$ order, the $9^{th}$ order, the $11^{th}$ order, and/or other harmonics. Because of the saturation in the core of the alternator, the attenuation of each harmonic increase logarithmically. Thus, the $3^{rd}$ and $5^{th}$ harmonics are the most detectable.

The field current profile may be adjusted to reduce the distortion caused by the harmonics, which may be referred to as total harmonic distortion (THD), to a threshold level. Example THD thresholds include 1%, 2%, 5% and 10%. Without field current control, design of a generator to meet the 1%, 2%, or even 5% THD threshold would involve very high inefficiency. However, controlling or fine tuning the field current profile may eliminate or reduce the effects of the harmonics in the output and meet very low THD thresholds.

Figure 9:
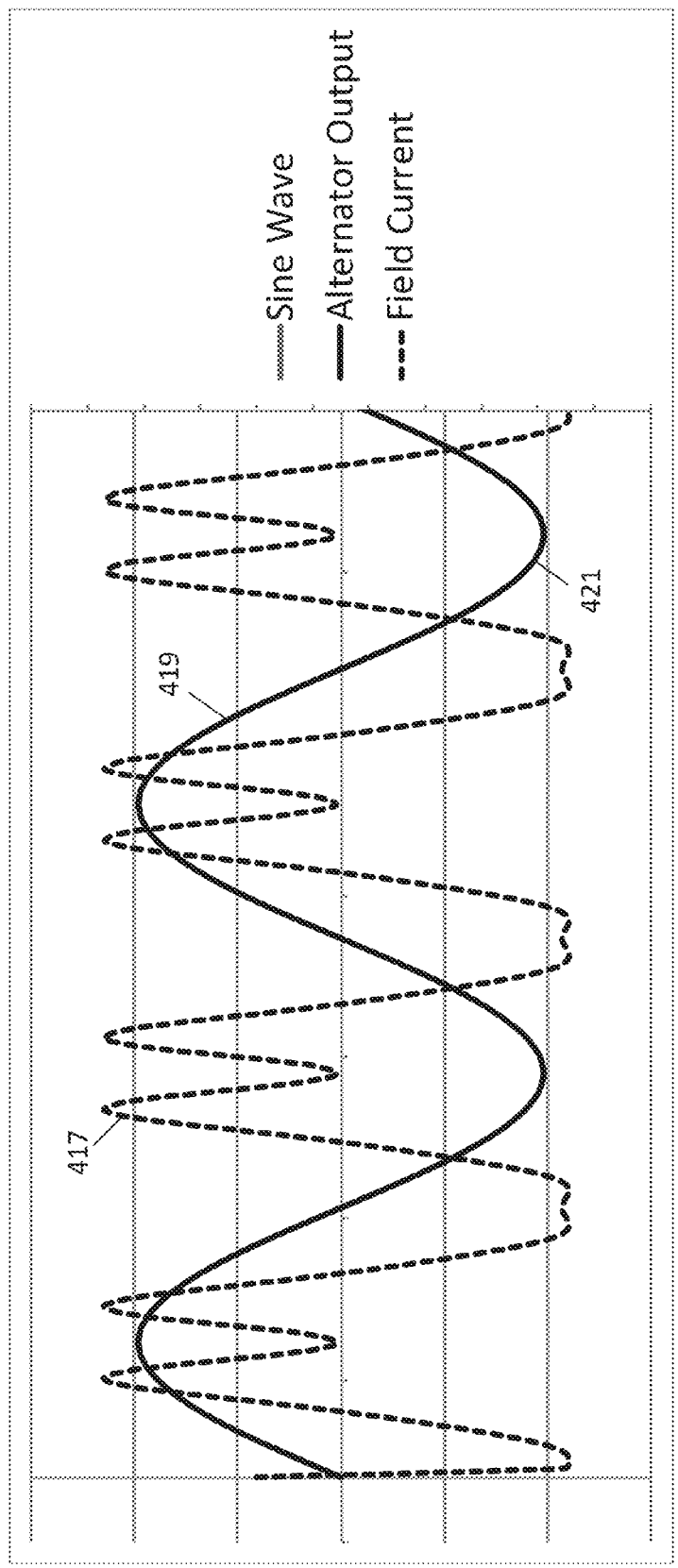
FIG. 9 illustrates the example output of FIG. 8 with a modified field current.

FIG. 9 illustrates the example output of FIG. 8 with a modified field current, shown by dotted line 417. The sine wave, shown by solid line 419, is unchanged from FIG. 8. However, the alternator output, shown by solid line 421, overlaps the sine wave. Thus, solid line 419 and 421 appear as a single line. The modified field current may have many different shapes. The shape may have multiple harmonics inversely related to the harmonics originally in the alternator output. The modified field current may have multiple minimums and maximums in each period. The change in output of the alternator (e.g., voltage, current, or power) is proportional to the field current of the alternator.

The modified field current may be varied at a higher amplitude to reduce harmonics than in the speed profile examples. The variance in the modified field current to reduce harmonics may be about 1.08 to 1.26 amp range over a 2 millisecond interval, as compared to a 1.19 to 1.21 amp range over a 16.7 millisecond interval discussed above with respect to some speed profile correction examples.

In some systems, the controller 10 may control the field current in accordance with predetermined settings or initial detections of generator parameters. In other systems, the controller 10 may monitor generator parameters (such as engine or alternator speed, output voltage, output current, or output power) continuously, periodically, randomly, when triggered, or at other times, and may modify the field current profile in accordance with any identified changes in the monitored parameters. Other variations are possible.

Figure 10:
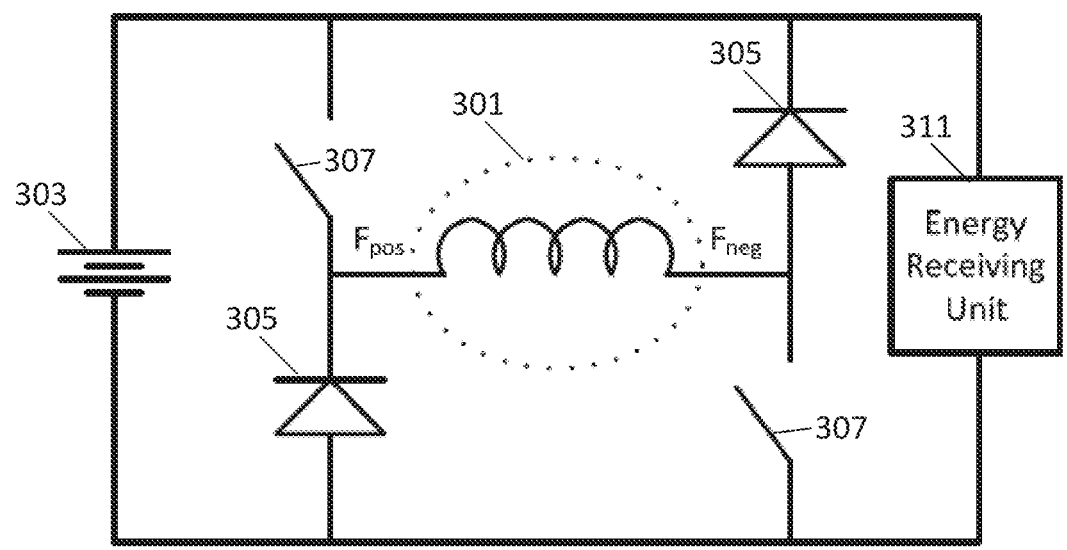
FIG. 10 illustrates an example regulator circuit.
Figure 11:
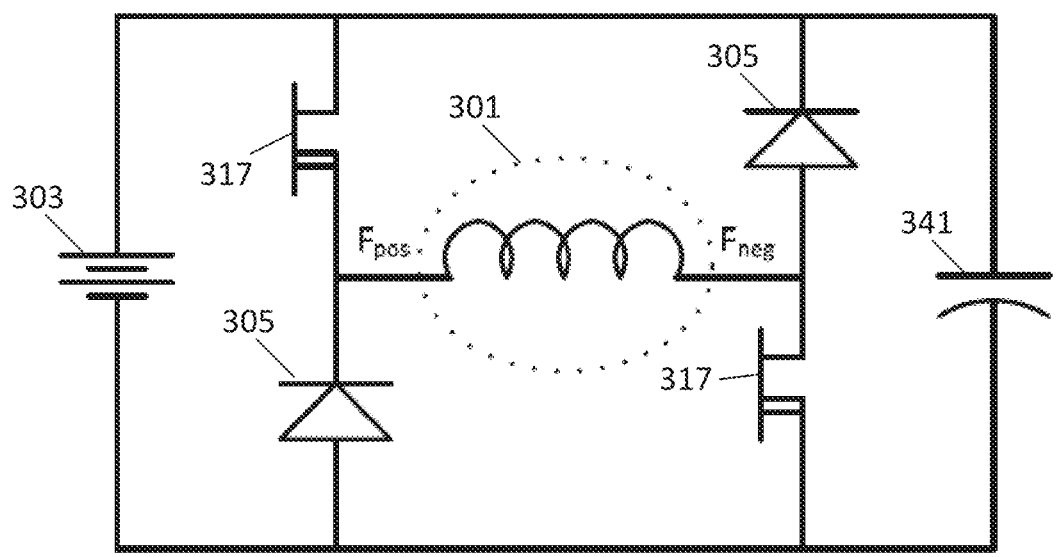
FIG. 11 illustrates another example regulator circuit.

FIG. 10 illustrates an example regulator circuit for implementing current profile control. The inductor 301 may correspond to the field coil 17 of the alternator 11 of the generator 100. The coil includes a field positive portion $F_{pos}$ and a field negative portion $F_{neg}$. A power source 303 supplies energy to the energy receiving unit 311. The energy receiving unit 311 may be a capacitor or another storage element. The diodes 305 may restrict a direction of flow in one path through the regulator circuit. Switches 307 may open and close another path through the regulator circuit. FIG. 11 illustrates another example regulator circuit in which the switches 307 are field effect transistors 317. Example components for the switches 307 also include operational amplifier, switch circuit, relay, or other types of transistors such as metal-oxide-semiconductor field effect transistor (FET), bipolar junction transistors, unijunction transistor, or thin film transistors.

Figure 12:
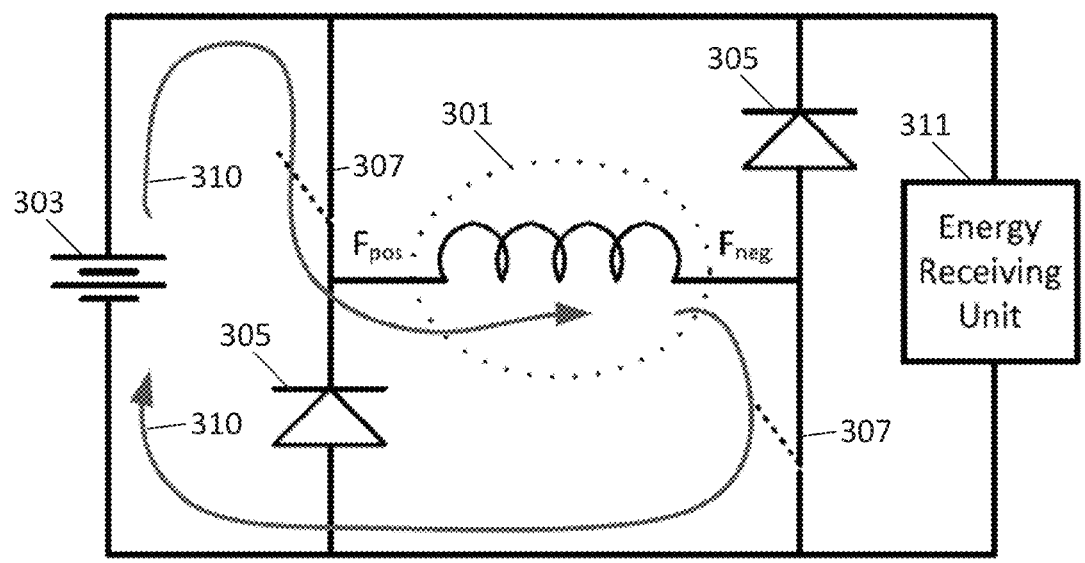
FIG. 12 illustrates the example regulator circuit of FIG. 11 in a first state.
Figure 13:
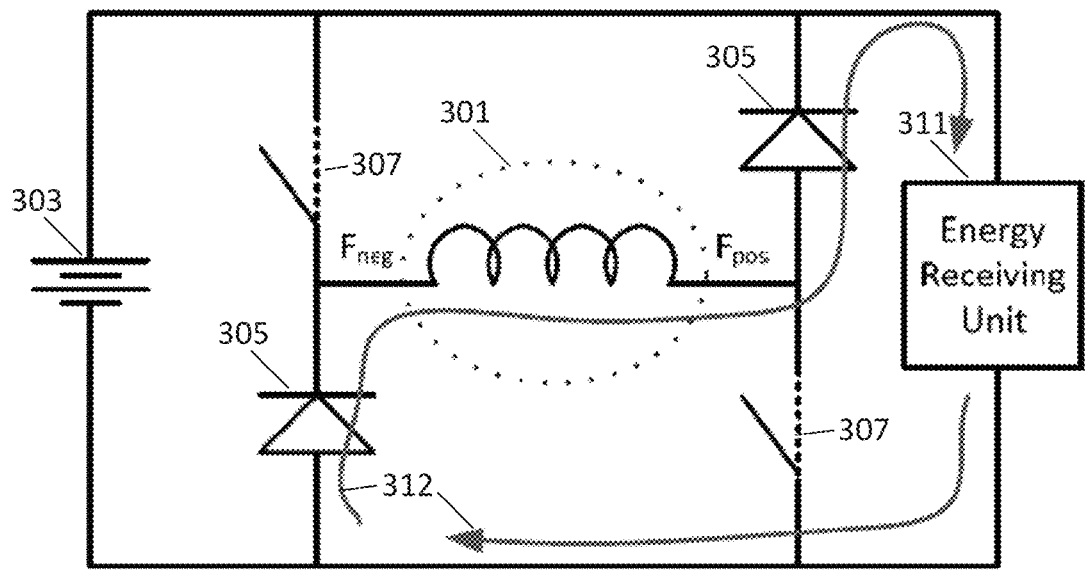
FIG. 13 illustrates the example regulator circuit of FIG. 11 in a second state.

FIG. 12 illustrates the example regulator circuit of FIG. 11 in a first state. In the first state, the switches 307 are closed, which allows current from the source 303 to flow through the inductor 301, as shown by arrows 310. The current through the inductor 301 in the first state flows from $F_{pos}$ to $F_{neg}$ (left to right in FIG. 12). FIG. 13 illustrates the example regulator circuit of FIG. 11 in a second state. In the second state, the switches 307 are open, which prevents current from the source 303 to flow through the inductor 301. However, if energy is stored in the inductor 301, current may flow from inductor 301 to the energy receiving unit 311, as shown by arrows 312. The current through the inductor 301 in the second state flows from $F_{neg}$ to $F_{pos}$ (left to right in FIG. 13).

The controller 10 may generate a switch command for driving the switches 307 (or FET 317) based on the profile for the generator 100. The switch command causes the switches to turn on and off, defining a duty cycle. The controller 10 increases the duty cycle of the switch command during at least one portion of the profile. For example, the switch command may be increased during positive slopes of the profile. The controller 10 decreases the duty cycle of the switch command during at least one other portion of the profile. For example, the switch command may be decreased during negative slopes of the profile. The switch command drives the active regulator in response to the switch command.

Figure 14:
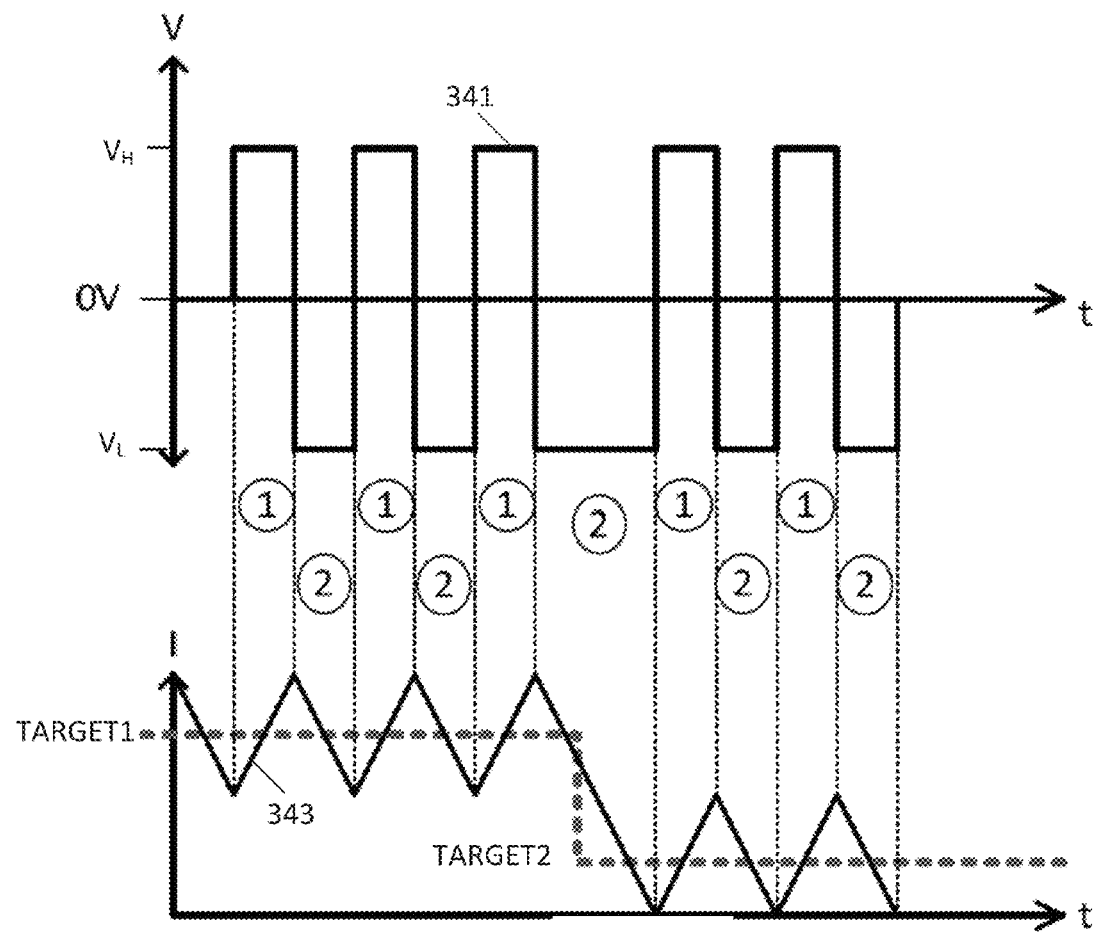
FIG. 14 illustrates an example duty cycle for the regulator circuit.

FIG. 14 illustrates an example duty cycle for a switch command 341 of the regulator circuit. The switch command 341 is set at a duty cycle between a high voltage ($V_H$) and a low voltage ($V_L$) in order to keep the field current at a target level. The first state and the second state are indicated by the encircled numbers (1) and (2). The width of the first state and the second state may be a predetermined time period (e.g., 1 millisecond or another value). In the first state, the field current 343 in the inductor 301 increases, and in the second state the field current 343 in the inductor 301 decreases. To move the field current 343 from one level to another (e.g., from TARGET 1 to TARGET2), one of the high voltage or low voltage may (first state or second state) may be active for a longer time period. In one example, when the duty cycle is about 50%, the field current 343 stays constant (or decreases slightly), when the duty cycle is above 50%, the field current 343 increases, and when the duty cycle is below 50%, the field current 343 decreases.

The active regulator circuit allows for precision and quick adjustments to the current through the inductor 301. If a typical switch were used to control the field current 343 through the inductor 301, the negatively sloped portion of field current 343 would be a slow decay (e.g., exponential decay) driven by the internal resistance of the inductor 301. That is, normally the operation of the inductor 301 resists current changes in short amounts of time. However, the active regulator circuit actively controls the field current by increasing the amounts of time that current is drawn from the inductor 301. The active regulator draws current from the inductor 301 using the energy receiving unit 311. The active regulator may control the field current 343 to track the engine profile at high speed rates (e.g., 1.0 amp per second or greater).

The active regulator circuit may control the field current 343 to reduce fluctuation in output from speed variations in the engine and from total harmonic distortion. One or both of the phenomena may be reduced by generating the switch command that tracks the expected current profile. In one example, the switch command may control adjustments at a low interval (e.g., on the order of every 10-20 milliseconds) to address expected changes in speed variation and adjustments at a high interval (e.g., on the order of every 1-2 milliseconds) to address expected fluctuations caused from harmonic distortion.

Figure 15:
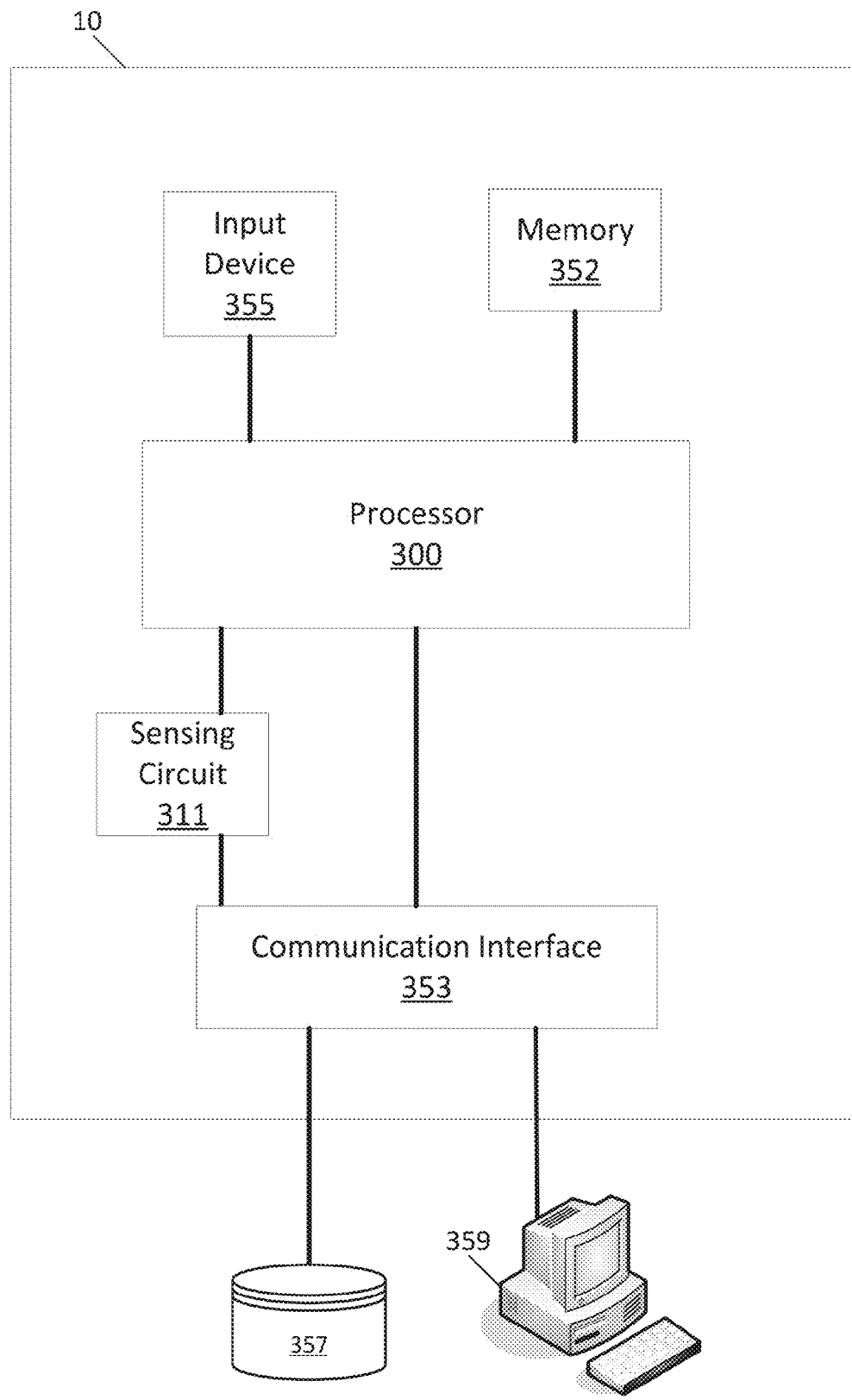
FIG. 15 illustrates an example controller of the system of FIG. 1.

FIG. 15 illustrates an example generator controller 10. The generator controller 10. The generator controller 10 may include a processor 300, a memory 352, and a communication interface 353. The generator controller 10 may be connected to a workstation 359 or another external device (e.g., control panel) and/or a database 357. Optionally, the generator controller 10 may include an input device 305 and/or a sensing circuit 311. The sensing circuit 311 receives sensor measurements from the detection circuit 15. Additional, different, or fewer components may be included.

The memory 352 may store a profile for a generator that describes a periodic fluctuation in an operating characteristic for the generator. The profile may track one of the inputs to the generator such as speed of the crankshaft or one of the outputs to the generator such as voltage, current, or power. The memory 352 may store multiple profiles. The profiles may be associated with different types of generators, different loads, different operating environments, or different sets of output tolerances.

The profiles in the memory 352 may be constant. For example, the profiles may be preloaded by a manufacturer. Alternatively, the profiles may be adjusted over time. The profiles may be adjusted based on the life cycle of the generator to account changes based on deterioration or service. The profiles may be adjusted in real time or near real time. A near real time adjustment is when measurements taken a short amount of time (e.g., 1 second, 10 second, or 1 minute) in the past are used to generate a profile for the near future. For example, the average profile detected over the last minute may be continuously updated and stored as the current profile for the generator.

The processor 300 may access the profile and control, based on the profile, a field current for an alternator associated with the generator. The processor 300 may generate a switching command having a duty cycle that tracks the slope of the profile. For example, when the profile increases, which indicative of an increasing generator output, the duty cycle slows in order to reduce the field current for the alternator, which tends to decreases the generator output. The resulting output may approach a sinusoid. The RMS value of the resulting output may approach a constant value.

The profile for the generator may be entered manually. For example, the communication interface 303 receives data indicative of profile from a network (e.g., the Internet), an external database 357, a control panel or other input device 355, or from the workstation 359. In addition or in the alternative, the communication interface 353 may receive a schedule for activating or deactivating the field current control, an real time command for activating or deactivating the field current control, a modification to one of the profiles, or a THD threshold from a network (e.g., the Internet), an external database 357, a control panel or other input device 355, or from the workstation 359. The input device 355 may be a flicker toggle switch that the user activates when flicker becomes noticeable.

The generator controller 10 may control multiple generators. The memory 352 may include profiles for multiple generators, and the processor 300 may generate field current profiles for multiple generators. In one example, the generators are parallel generators that are mechanically connected via crankshafts and electrically connected via a bus. In this case, the field current profiles may be identical or vary only to the extent of the physical differences between generators. The generator controller 10 may also generate switch commands to couple and decouple the generators from the bus. The controller may be internal to or connected with one or more of the generators, included in a standalone device, in or connected with another device such as an automatic transfer switch, or in various other devices, locations, or connections.

In another example, the generators are not mechanically connected and may be assigned varying current profiles based on both the respective speeds of the engines and the physical differences between generators. A communication line may facilitate data communication between generator controllers. The communication may be Modbus or another protocol.

Figure 16:
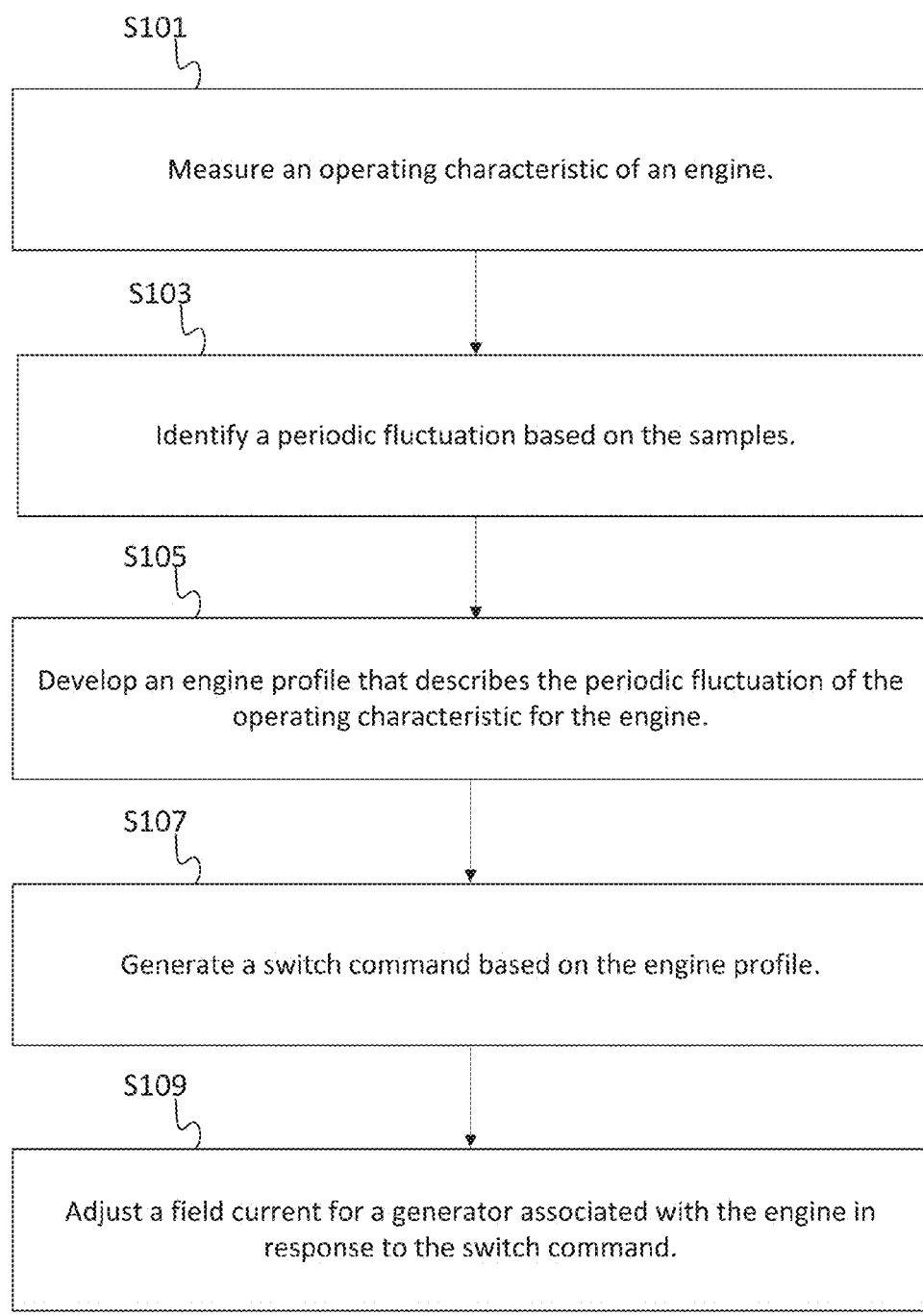
FIG. 16 illustrates example flowchart for field current control.

FIG. 16 illustrates example flowchart for field current control. The methods in FIG. 16 may, in some instances, be implemented as logic or software executable by a controller, such as generator controller 10. Additional, different, or fewer acts may be provided. The acts may be performed in the order shown or other orders. The acts may also be repeated.

At act S101, the controller measures an operating characteristic of an engine. The operating characteristic may be the speed of the engine, an output current, voltage, or power, or various other characteristics. At act S103, the controller identifies a periodic fluctuation based on the measurements. In one example, the measurements are sampled at a sample interval. The sample interval may be equivalent to, or divide evenly into, the period of the engine. Thus, a set of samples may be constructed into a periodic fluctuation. In another example, the sample interval may not divide into the period of the engine, but may be manipulated to identify the period of the engine.

For example, the controller may identify multiple cycles from the set of samples and calculate an average of corresponding points from the multiple cycles. The engine profile is generated from the average of the corresponding points.

At act S105, the controller develops or generates an engine profile that describes the periodic fluctuation of the operating characteristic of the engine. When the operating characteristic is speed, the periodic fluctuation may be based in part on the combustion cycles of the engine.

At act S107, the controller generates a switch command based on the engine profile. The switch command may be selected to follow the engine profile. In one example, a duty cycle of the switch command is increased for positively sloped portions of the engine profile and decreased for negatively sloped portions of the engine profile.

At act S109, the controller adjusts a field current for an alternator associated with the engine in response to the field current profile. For example, the controller may send the switch command to a regulator circuit that activates and deactivates one or more power sources with a field coil of the alternator. The switch command may activate one or more switches to increase current flow to the field coil and deactivate one or more switches to decrease current flow to the field coil. The switch command may activate one or more first switches to increase current flow to the field coil and activate one or more second switches to decrease current flow to the field coil.

In other variations, the controller may identify an engine type, make, or model, and may look up a predetermined engine profile based on the identified engine type, make, or model. The controller may generate a field current profile in accordance with the identified predetermined engine profile. In still other examples, the controller may look up a predefined field current profile based on the identified engine type, make, or model. In any of these examples, the system may perform act S109 thereafter. Other variations are possible.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving data indicative of an operating characteristic for a generator; and
   generating a profile for the generator based on the data indicative of the operating characteristic for the generator;
   wherein the profile indicates a level of a field current for an alternator associated with the generator.

2. The method of claim 1, wherein the operating characteristic describes an output of the alternator including harmonics caused by operation of the alternator.

3. The method of claim 1, wherein the operating characteristic at least in part represents a load on the generator.

4. The method of claim 1, wherein the profile is a first profile corresponding to a first load on the generator, the method further comprising:
   generating a second profile for the generator based on data indicative of the operating characteristic for the generator at a second load.

5. The method of claim 4, further comprising:
   storing, in memory, the first profile associated with the first load; and storing, in memory, the second profile associated with the second load.

6. The method of claim 1, further comprising:
storing the profile in memory.

7. The method of claim 1, wherein the profile fluctuates according to combustion cycles of an engine associated with the generator.

8. The method of claim 1, wherein a shape of the profile varies corresponds to a number of cylinders of an engine associated with the generator.

9. The method of claim 1, wherein the operating characteristic is a speed of the alternator.

10. The method of claim 1, wherein the operating characteristic is a voltage value for the alternator, a current value for the alternator, or a power value for the alternator.

11. An apparatus comprising:
a controller configured to receive data indicative of an operating characteristic for a generator and generate a profile for the generator based on the data indicative of the operating characteristic for the generator; and
a memory configured to store the profile for the generator, wherein the profile indicates a level of a field current for an alternator associated with the generator.

12. The apparatus of claim 11, wherein the operating characteristic describes an output of the alternator including harmonics caused by operation of the alternator.

13. The apparatus of claim 11, wherein the operating characteristic corresponds to a load on the generator.

14. The apparatus of claim 11, wherein the profile is a first profile corresponding to a first load on the generator, the controller further configured to generate a second profile for the generator based on data indicative of the operating characteristic for the generator at a second load.

15. The apparatus of claim 11, wherein the profile fluctuates according to combustion cycles of an engine associated with the generator.

16. The apparatus of claim 11, wherein a shape of the profile varies according to a number of cylinders of an engine associated with the generator.

17. The apparatus of claim 11, wherein the operating characteristic is a speed of the alternator.

18. The apparatus of claim 11, wherein the operating characteristic is a voltage value for the alternator, a current value for the alternator, or a power value for the alternator.

19. A method comprising:
receiving sensor data for a generator; and
generating a profile for the generator based on the sensor data for the generator;
wherein the profile indicates a level of a field current for an alternator associated with the generator.

20. The method of claim 19, wherein the profile describes an output of the alternator including harmonics caused by operation of the alternator.

* * * * *